(12) United States Patent
Rachet et al.

(10) Patent No.: US 8,560,727 B2
(45) Date of Patent: Oct. 15, 2013

(54) DATA ROUTING SYSTEM

(75) Inventors: Alain Rachet, Elancourt (FR); Olivier Katz, Fontenay les Briis (FR); Frédéric Lemaitre, Le Mesnil Saint Denis (FR); Henri Frances, Nozay (FR)

(73) Assignee: MBDA France, Paris (FR)

( * ) Notice: Subject to any disclaimer, the term of this patent is extended or adjusted under 35 U.S.C. 154(b) by 370 days.

(21) Appl. No.: 12/921,543

(22) PCT Filed: Mar. 9, 2009

(86) PCT No.: PCT/FR2009/000240
§ 371 (c)(1),
(2), (4) Date: Sep. 8, 2010

(87) PCT Pub. No.: WO2009/118481
PCT Pub. Date: Oct. 1, 2009

(65) Prior Publication Data
US 2011/0029690 A1 Feb. 3, 2011

(30) Foreign Application Priority Data
Mar. 13, 2008 (FR) ...................................... 08 01379

(51) Int. Cl.
*G06F 15/173* (2006.01)
(52) U.S. Cl.
USPC ........................................................ 709/238
(58) Field of Classification Search
USPC ........................................................ 709/238
See application file for complete search history.

(56) References Cited

U.S. PATENT DOCUMENTS

| | | | | |
|---|---|---|---|---|
| 4,984,190 A | * | 1/1991 | Katori et al. | 709/237 |
| 5,490,252 A | * | 2/1996 | Macera et al. | 709/249 |
| 5,896,414 A | * | 4/1999 | Meyer et al. | 375/222 |
| 6,094,708 A | * | 7/2000 | Hilla et al. | 711/138 |
| 6,856,591 B1 | * | 2/2005 | Ma et al. | 370/216 |
| 2004/0017820 A1 | | 1/2004 | Garinger et al. | |
| 2007/0075734 A1 | | 4/2007 | Ramos et al. | |
| 2007/0186018 A1 | | 8/2007 | Radulescu et al. | |

FOREIGN PATENT DOCUMENTS

WO WO2004/012092 2/2004

OTHER PUBLICATIONS

Krasnov, et al., "RAMP Blue: A Message-Passing Manycore System in FPGAs," Field Programmable Logic and Applications, IEEE, PI, Aug. 1, 2007, pp. 54-61.
Marescauxt, et al., "Interconnection Networks Enable Fine-Grain Dynamic Multi-Tasking on FPGAs," Lecture Notes in Computer Science, Berlin, vol. 2438, Sep. 1, 2002.
Daily, et al., "Route Packets, Not Wires: On-Chip INterconnection Networks," Proceedings of the 38th Annual Design Automation Conference, Las Vegas, NV, vol. 38,Jun. 2001.

* cited by examiner

*Primary Examiner* — Christopher Biagini
(74) *Attorney, Agent, or Firm* — Novak Druce Connolly Bove + Quigg LLP

(57) ABSTRACT

According to the invention, the router (5) comprises wired logic functions that at least partially use the logic circuits of the main computer (2).

10 Claims, 3 Drawing Sheets

DATA ROUTING SYSTEM

CROSS-REFERENCE TO RELATED APPLICATIONS

This application is a §371 national stage entry of International Application No. PCT/FR2009/000240, filed Mar. 9, 2009, which claims priority to French Patent Application 08001379, filed Mar. 13, 2008, the entire contents of which are incorporated herein by reference.

FIELD OF THE INVENTION

The present invention relates to a data routing system enabling data exchange between several electronic calculators through communication links.

BACKGROUND OF THE INVENTION

Although non exclusively, the routing system in accordance with the present invention is particularly well adapted to work in a real-time environment.

It is known that, in such environment, to exchange data between the several calculators of a same routing system having communication links of a heterogeneous type (i.e. having different electric standards and communication protocols being associated), within appropriate calculators of the system a dedicated processor and its associated application are embedded. Each dedicated processor processes then the inputs/outputs of the calculator into which it is integrated and can more particularly perform a protocol adaptation of the exchanged data.

However, the addition of a processor into a calculator substantially increases the volume thereof that can become restricting, for example when a reduced size is required. Moreover, the cost of such a processor and the integration thereof into the calculator, as well as the cost of the associated software application development increase considerably the final price of the calculator. Additionally, the working calculator wastes, within the calculator, an extra heat power which can require, the case being, the integration of an extra cooling system (for example a fan) into the calculator. The data transmission rate being accessible through the inputs/outputs of the calculator is also limited by the significant data processing time by the software application being associated with the processor.

SUMMARY OF THE INVENTION

Thus, an object of the present invention is to compensate for such disadvantages.

To this end, according to the invention, the data routing system comprising at least one transmission assembly including a primary calculator being adapted to pilot a process, at least one router and at least two secondary calculators connected to said primary calculator which controls them through communication links, a data exchange protocol being associated with each of said communication links, is remarkable in that:
said router is piloted by said primary calculator;
said router comprises wired logic functions using at least one part of the logic circuits of said primary calculator; and
said router comprises protocol adaptation means so as to be able to provide the transfer and the data protocol adaptation between said primary calculator and said secondary calculators, particularly when said communication links are of a heterogeneous type.

So, the routers of the transmission assemblies, for example integrated into the primary calculators, use apart of the logical resources (i.e. logic gates of logic circuits) of such calculators so as to make the data transfer management at the level of their inputs/outputs. The routing system of the invention works consequently with no intervention of the processor(s) of the primary calculators, except upon the system initialization (although a purely material initialization should be envisaged), and independently from the software application associated with each of the processors of the primary and secondary calculators.

Moreover, since the data transfer and protocol adaptation are carried out by wired logic functions within the logic circuits of the primary calculators and that no extra software application being associated with a processor is necessary, the data processing period within the routers is negligible (at the most a few µs).

Furthermore, since no extra processor is embedded into the primary calculators, the latter do not suffer any volume increase and no cooling device is necessary.

Preferably, the routing system comprises at least two such transmission assemblies, the primary calculators of which are interconnected through a high rate serial communication link, so that the primary calculator of one of said transmission assemblies is adapted to observe and control the primary and secondary calculators of the other assembly.

Thus, a primary calculator of a transmission assembly can pilot simultaneously at a distance the primary calculators of other transmission assemblies, as well as their secondary calculators being associated, when they are connected to each other through the high rate communication link.

Moreover, said primary calculator of such a transmission assembly is also connected through a serial high rate communication link to testing and analysing means so as be able namely to check out and regulate said primary and secondary calculators of each of the transmission assemblies in said system.

Advantageously, the rate of the high rate serial communication link is higher than the cumulated rate of said communication links.

Preferably, said high rate serial communication link is the Ethernet bus working under the IP protocol (Internet Protocol).

In fact, the Ethernet bus enables communication distances and transmission rates being satisfactory for most of real-time on-board applications.

Moreover, the router of each of the transmission assemblies comprises communication ports interconnected through an interconnection matrix, said matrix being adapted to perform an automatic diffusion of data from a communication port to several other communication ports which are connected to it. Such diffusion is also called multidiffusion.

Thus, several calculators being recipients of the routing system can receive similar data coming from a same source calculator.

Furthermore, at least one of said communication ports of said router comprises a DMA (Direct Access Memory) controller for a direct access to the memory in emission and a DMA controller in reception.

Thus, thanks to the DMA of such communication ports, the transfer of a data message needs at the most an emission writing (setting of the emission DMA) and a reception reading (reading of the reception semaphore) on behalf of the processor of the primary calculator comprising the router.

Moreover, each communication port of said router comprises such protocol adaptation means making possible to provide the coherence of the protocols associated with the data being exchanged between said calculators of each of the transmission assemblies.

So, a data encapsulation/decapsulation organ can for example be implemented by the protocol adaptation means to carry out such adaptation.

Furthermore, the data being under the form of data messages, each of said communication ports of said router comprises filtering means for the addresses associated with said data messages so that said port transfers, over the communication link being connected thereto, only the messages having an address being filtered by said filtering means.

Thus, thanks to the interconnection matrix (providing a multidiffusion of the messages) and to the address filtering principle of the filtering means, a message can be sent with no action of the source (other than an adapted choice of addresses towards one or more recipients), canceling at least one part of the software load related to the data transfer.

Moreover, said communication ports of said router comprise dating means for data crossing said ports.

Thus, dating the messages being in circulation in the routing system allows taking a part in the setting of the routing system, for example through the testing and analyzing means.

Advantageously, said logic circuits of the primary calculator of each of the transmission assemblies are programmable logic circuits of FPGA (Field Programmable Gate Arrays) type.

Indeed, the wired logic functions of the router can be easily embedded into the recent FPGA logic circuits which all provide Mac Ethernet interfaces.

Preferably, the routing system works in a real-time data processing environment.

BRIEF DESCRIPTION OF THE DRAWINGS

The figures of the accompanying drawing will make it well understood how the invention can be implemented. On such figures, like reference numerals show like components.

DETAILED DESCRIPTION

The data routing system in accordance with the present invention allows data from a source to be routed towards one or more recipients through digital communication links. Such a routing system works preferably in a restricted real-time data processing environment.

In a particular exemplified embodiment in accordance with the present invention, data are exchanged in the routing system as messages (i.e. data blocks having a start identifier and an end identifier). The structure of each message is in accordance with the protocol associated with the communication link through which the message passes from the source to the recipient(s).

Figure 1:
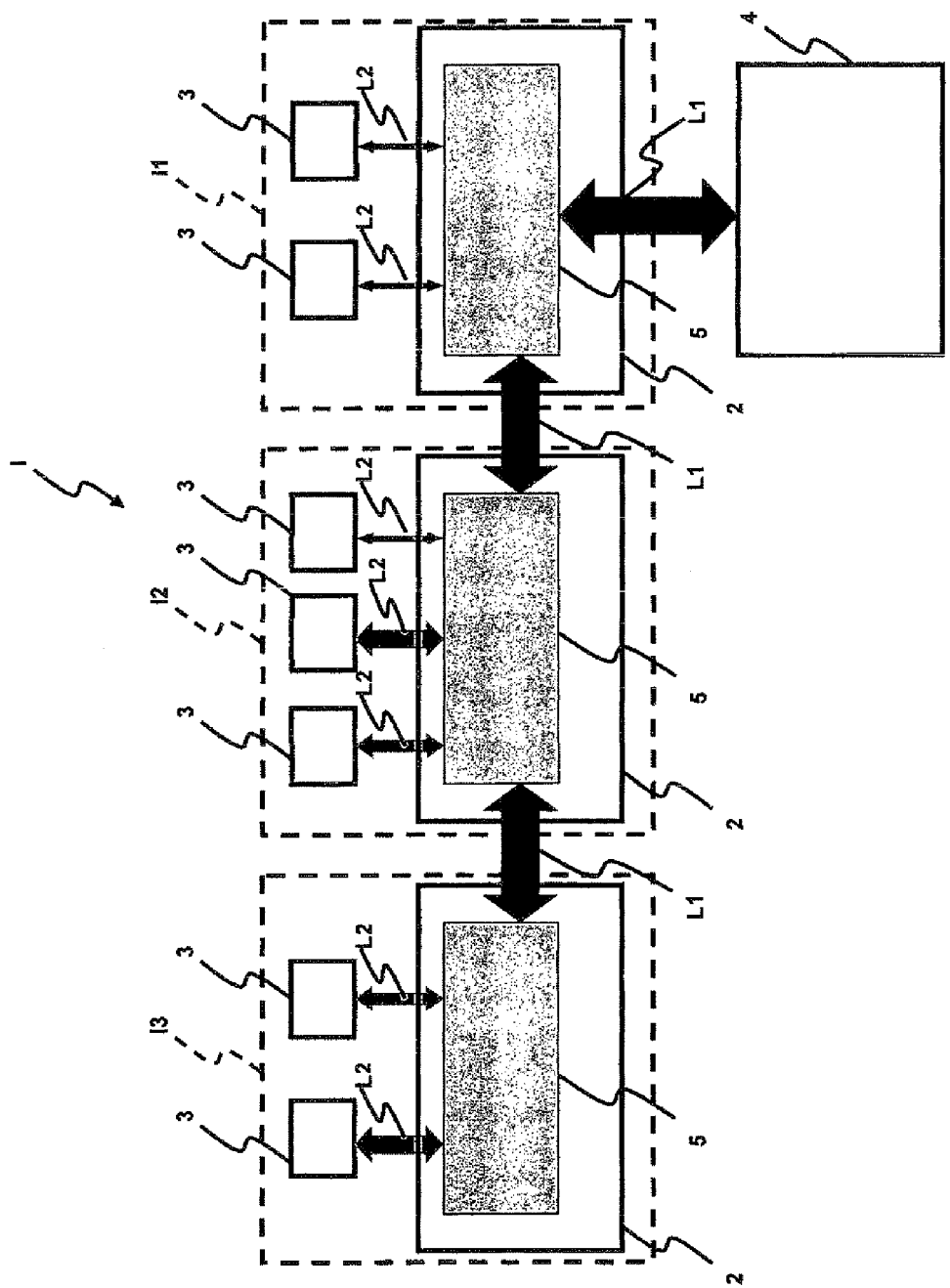
FIG. 1 schematically shows a particular embodiment of the data routing system accordance to the present invention.

As shown on FIG. 1, the routing system in accordance with the invention comprises:
transmission assemblies I1, I2, I3 including each:
a primary calculator 2 adapted to pilot a process (for example technical, industrial, etc.), being connected to each other through a high-rate serial communication link L1 (referred as to primary bus) based on a point-to-point connection principle;
an heterogeneous router 5 for transfer and data protocol adaptation within the routing system I;
secondary calculators 3 (for example actuators, sensors, recorders, etc.) connected to the primary calculator through digital communication links L2 (referred as to secondary busses) of a heterogeneous type, the primary calculator 2 controlling said secondary calculators 3;
testing and analysing means 4 of the routing system I connected to the primary calculator 2 of a transmission assembly I1, I2, I3 through the primary bus L1. Such testing and analysing means 4 enable for example to observe and parameterize the routing system I, as well as to check at a distance the primary and secondary calculators (2, 3).

It is to be noticed that each of the primary and secondary calculators (2, 3) can be a source or a recipient for data messages. In the routing system I according to the invention, data can be transmitted from a source to one or more recipients, even if:
the recipients are connected to communication links of another type than the link the source is connected to;
the recipients are located at transmission distances being incompatible with the source location.

In the examplified embodiment, the primary bus L1 is advantageously the Ethernet bus (for example, in 100 Mb/s or 1000 Mb/s) operating under the IP protocol, which provides for data routing. The Ethernet bus authorizes transmission distances and transfer rates being satisfactory for most of real-time embedded explanations. The primary bus L1 has preferably a transfer rate being higher than the cumulated real rate of the set of secondary busses L2 of heterogeneous type so as to provide a real-time transmission with no message loss.

It is to be noticed that, upon data exchanges about the secondary busses L2, each group of data messages for a same group of recipients has an own identifier. If the secondary bus L2 is very simple (for example the bus known in the art under the reference RS422 with no particular communication protocol being associated), there is only one recipient or one group of recipients whose the common point is the physical communication ling itself (i.e. that all messages exchanged over such link will be routed similarly). If the secondary bus L2 is more elaborated (it is then a multidata system), the protocol being associated has available naturally as a minimum a single identifier (or even routing information) per message.

In a preferred embodiment in accordance with the invention, a heterogeneous router 5 is integrated into each of the primary calculators 2. Nevertheless, it can be envisaged in a variant to integrate several routers in a same primary calculator.

Figure 2:
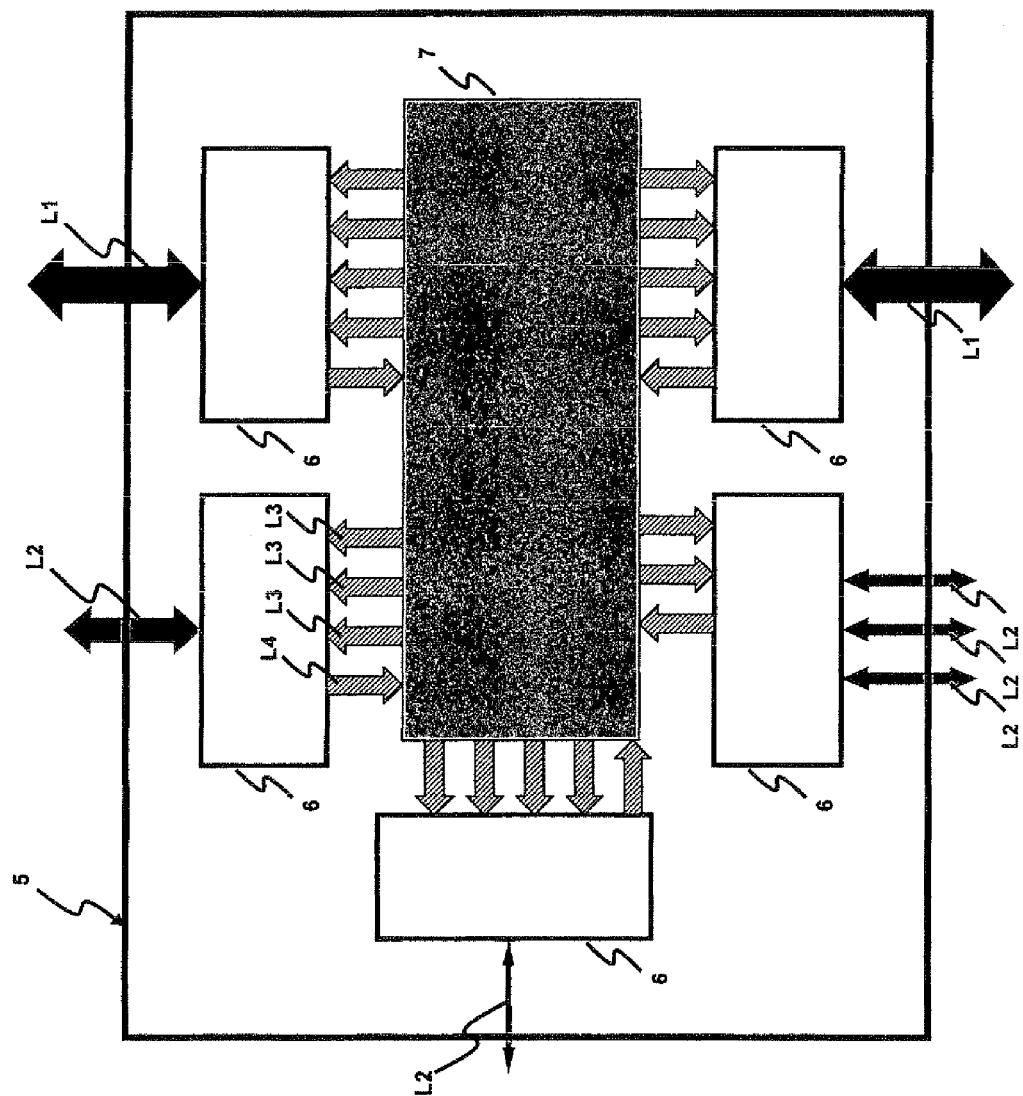
FIG. 2 schematically shows the architecture of one of the heterogeneous data routers implemented in one of the primary calculators of the routing system of the invention shown on FIG. 1.

As shown on FIG. 2, the routers 5 comprise communication ports 6 (further disclosed in relation with FIG. 3), serving as connection interface for the primary and secondary busses (L1, L2), and an interconnection matrix 7. It is to be noticed that the ports 6 connected to the primary bus L1 are chaining ports for providing the point-to-point connection of the primary bus L1.

According to the invention, each interconnection matrix 7 is advantageously provided at least partially through programmable logic circuits (for example of FPGA or ASIC (Application Specific Integrated Circuit) type belonging to the primary calculator 2 comprising said matrix 7. It is determined upon the creation of the architecture of the routing system I. To this end, a material interconnection of the different communication ports 6 is first carried out so that the communication ports being able to exchange data are physically interconnected with each other. As shown on FIG. 2, the arrows L3 symbolize the material interconnections through which each communication port can receive messages from other communication ports which it is connected to. The arrow L4 symbolizes in turn the material interconnection through which each port can transfer data messages to the interconnection matrix 11.

Then, a software setup of the matrix 7 is performed to make effective at least one part of the material interconnections being made. It is to be noticed that, if the material interconnection of the communication ports cannot be modified once being made, the software setup of the interconnection matrix 7 can in turn be actualized according to the developments of the routing system I.

Figure 3:
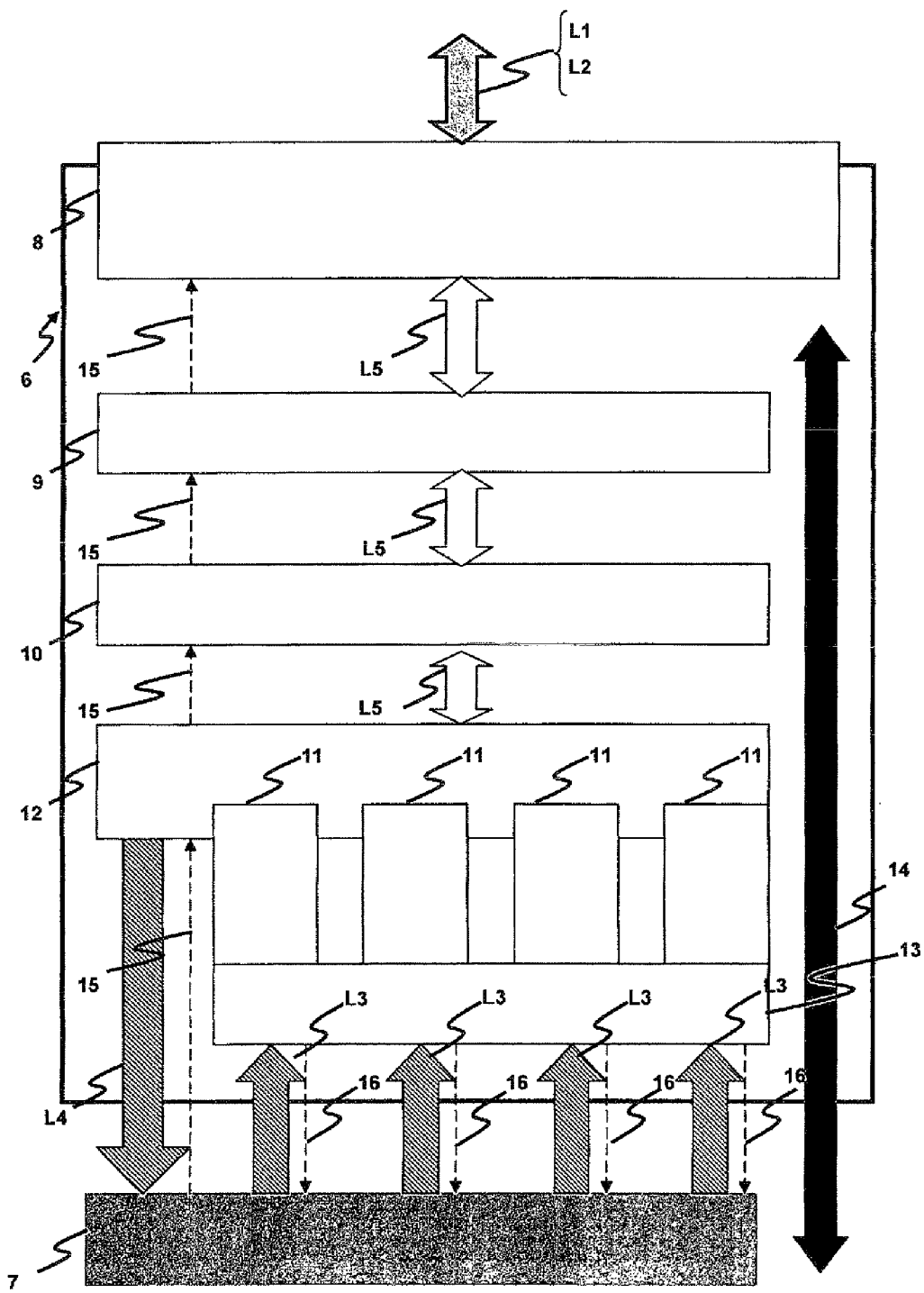
FIG. 3 schematically shows the generic architecture of a communication port used by the invention and embedded into the heterogeneous router of FIG. 2 above-mentioned.

Thus, each interconnection matrix 7 provides for:
an automatic diffusion of the messages from each of the communication ports of the router 5 to the other communication ports interconnected to such a port so as to be received by several recipient calculators (multidiffusion);
a part of the message traffic regulation while emitting towards the so-called "intelligent" ports (for example less processor ports, being disclosed herebelow) of transmission stop controls (symbolized by the dotted arrows 15 on FIG. 3 disclosed later on) in case of an overrun of the communication ports of the router 5 (the processor ports emitting beforehand overrun messages symbolized by the dotted arrows 16 on FIG. 3).

As shown on FIG. 3, the simplified architecture of a communication port 6 comprises in particular:
connection means 8 which make a direct interface with the communication link (primary or secondary bus L1, L2) connected to said port. Such a direct interface is provided by an interface member (known in the art under the reference PHY or line driver according to the complexity thereof). The connection means 8 also provide a checkout of the protocol layers being associated with the communication link. Such a checkout (for example the calculation of CRC (Cyclic Redundancy Check) coefficients, the management of low level errors, etc.) is consequently suitable to each communication link;
protocol adaptation means 9 which allow the format of messages from the communication link to be in accordance with the format of messages consumed by the interconnection matrix 7. Thus, the format of messages exchanged between the communication port 6 et the interconnection matrix 7 is the same as the message being either inputted or outputted. In the examplified embodiment of the invention, the format of the messages being consumed and delivered by the matrix 7 is of the IP/UDP (User Datagram Protocol) type. Such a protocol adaptation can be provided by data encapsulation/decapsulation;
message dating means 10 optionally implemented;
temporary storing means 11 (for example buffer memories) for the input and output messages of the communication link. A management of the buffer memories 11 enables in particular to manage potential collisions of the messages being exchanged;
priority management means 12 for the buffer memories 11; and
filtering means 13 for the addresses associated with the exchanged messages so as to manage the diffusion of messages over the communication links of the routing system I. Thus, the filtering means 13 in combination with the interconnection matrix 7 allow a message to be sent from a source to several given recipients with no action of the source other than an adapted choice of addresses of such recipients.

As shown on FIG. 3, the arrows L5 symbolize data transfers between the above-mentioned different means of the communication port 6.

Moreover, the architecture of a communication port also comprises the following means (non shown on FIG. 3):
message transfer means towards and from the memory of the processor of the primary calculator 2 connected to the interconnection matrix 7;
management means for the state of the buffer memories 11;
destruction means for messages into errors; and
destruction means for messages which are not provided for the communication port being considered.

It should be noticed that the communication ports 6 need parameters to operate (for example the operating frequency for the communication link being connected, the intermessage gap, etc.). Such parameters are for example loaded upon the switching on of the primary calculator 2, either through the calculator processor which acts then as a controller of the router 5 upon such phase, or through a permanent memory (for example within the router 5) through a parameterization bus 14 being internal to the router 5.

Moreover, two types of communication ports 6 can be distinguished: the bus ports and the processor ports. The differences between those two types of ports lie essentially on:
the type of bus being supported. For example, the processor ports are generally connected to known bus types of the art under the references PCI, PCI ex, Rapidio, PLB, amba, etc., whereas the bus ports are in turn usually connected to all the big serial bus standards (for example RS422);
the presence of controllers DMA with a direct access to the memory in the processor ports. Such controllers DMA in reception and in emission allow messages to be received and emitted with no dynamic intervention (other than the authorization to emit or acknowledge the input messages) from the processor of the primary calculator 2 comprising the router 5. A differentiated ranking of the input messages is also carried out by a controller DMA in reception which should have at its disposal an extra piece of information about such messages (for example the target software process of the processor). To this end, considering input messages in accordance with the protocol IP, the protocol overlayer UDP can be selected. The principle of the differentiated ranking is the as follows:
a piece of process information in accordance with the protocol UDP (also referred as to a socket UDP) being associated with an input message is analyzed by the DMA in reception, then converted into a ranking address through a table of correspondence being documented, for example, by the processor of the primary calculator 2 upon the initialization thereof. It is to be noticed that, when process information are not available, un default process, which corresponds to an ranking area, a so-called bin, is associated with the input message being considered;

the ranking area corresponding to the ranking address is protected by a semaphore. When such semaphore is disabled, the input message is ranked in the ranking area and the semaphore is activated. On the contrary (the semaphore is already activated), the processor has not read the preceding message ranked in the ranking area and the message being considered is put in the bin, also protected by a semaphore. Such ranking activates an error counter;

no ranking area is free, then the input message is destroyed and the error counter is incremented;

It is to be noticed that, in the case where no information about the target software process associated with the message is available, it is to be envisaged to modify the controller DMA in reception using more complex techniques of buffer storage (for example of circular type where the input message is overwritten only a given number of messages later) so as to overload as little as possible the processor of the calculator. Moreover, thanks to the controllers DMA of the processor ports, the transfer of a message needs at the most a writing in emission (the setting of the emission controller DMA) et a reading in reception (the reading of the reception semaphore), thus reducing significantly the software load related to the data transfer;

the fact that the pending data transfer over the processor ports can always be suspended with no data losses, whereas the pending transfer over the bus ports cannot be interrupted (at least when they are connected to most of current series bus). It is to be further reminded that the transmission stop commands (symbolized by the arrows 15 on FIG. 3) and the overrun messages (symbolized by the arrows 16) are only generally implemented in the processor ports.

Moreover, the architecture of a communication port 6 can be modified so as to confer it an essential function in the analysis of the real-time operation of the processor of a primary calculator 2. Such a so-modified communication port, referred as to Real-Time Monitoring Port or PTSR hereinbelow, has available a connection to the interconnection matrix 7 of the router 5 and a connection (for example through a very high rate communication link being known in the art under the denomination PCI) to the processor of the primary calculator 2. Through the message dating means 10 of the port PTSR, the messages from the processor are dated with an appropriate precision (for example a microsecond) and stored in a memory of a size adapted for each application managed by the processor (for example 256 words of 32 bits). Such a memory is periodically dumped into the routing system I towards the testing and analyzing means 4, the period depending on the application being implemented by the processor. The emission monitoring for the messages over the processor is adapted for each application. As monitoring examples, the transit of a particular message, the use of a time basis, the triggering of a watch dog, etc. can be mentioned.

Thus, the analysis of messages from the processor enables, for example for the testing and analysis means 4, to put at distance and with no intrusion within the primary calculator 2 of an image of the real-time activities of such processor, particularly so as to contribute directly to a checkout of the routing system I.

Moreover, one of the communication ports of the router 5, referred to as testing port, connected to the primary bus L1 can be dedicated to the checkout and to the validation of the routing system I. The messages circulating within the routing system I and dated automatically by the dating means 10, upon their input into the router, can be received through such testing port with no action of the sources (an automatic multidiffusion being performed by the connection matrix 7 of the different routers 5 of the system I) so as to implement an analysis of the data transfers in the system I. However, it is possible to select the destination address as well as the address filters of the filtering means 13 of the testing port so as to select the best adapted messages for the validation of the system 1.

The invention claimed is:

1. Data routing system (I) comprising a plurality of transmission assemblies (I1, I2, I3) each including:
    a primary calculator (2) comprising
    a processor,
    at least one router (5) and
    at least two secondary calculators (3) connected to said primary calculator (2) which controls them through communication links (L2),
    a data exchange protocol being associated with each of said communication links (L2),
    wherein:
    said communication links (L2) are of a heterogeneous type, having different electric standards and different communication protocols;
    said router (5) is controlled by said primary calculator (2);
    said router (5) comprises wired logic functions using at least one logic circuit of said primary calculator (2);
    said router (5) being configured to transfer data between said primary calculator (2) and said secondary calculators (3) and to provide a data protocol adaptation between said primary calculator (2) and said secondary calculators (3); and
    the primary calculator (2) of the plurality of transmission assemblies are interconnected through a high rate serial communication link (L1), so that the primary calculator (2) of each of the plurality of transmission assemblies (I1, I2, I3) is adapted to observe and control the primary and secondary calculators of another one of the plurality of transmission assemblies.

2. Data routing system according to claim 1, wherein the rate of the high rate serial communication link (L1) is higher than the cumulated rate of said communication links (L2).

3. Data routing system according to claim 1, wherein said high rate serial communication link (L1) is an Ethernet bus working under an IP protocol.

4. Data routing system according to claim 1, wherein the router (5) of each of the transmission assemblies (I1, I2, I3) comprises communication ports (6) interconnected through an interconnection matrix (7), said matrix being adapted to perform an automatic diffusion of data from a communication port (6) to several other communication ports which are connected to it.

5. Data routing system according to claim 4, wherein at least one of said communication ports (6) of said router (5) comprises a DMA (Direct Access Memory) controller for a direct access to the memory in emission and a DMA controller in reception.

6. Data routing system according to claim 4, wherein each communication port (6) of said router (5) is configured to provide coherence of the protocols associated with the data being exchanged between said calculators (2, 3) of each of the transmission assemblies (I1, I2, I3).

7. Data routing system according to claim 4, wherein, the data being under the form of data messages, each of said communication ports (6) of said router (5) is configured to filter addresses associated with said data messages so that said port transfers, over the communication link (L2) being connected thereto, only the messages having an address being filtered by said filtering means (13).

8. Data routing system according to claim 4, wherein said communication ports (6) of said router (5) is configured to date data crossing said ports.

9. Data routing system according to claim 1, wherein said logic circuits of the primary calculator (2) of each of the transmission assemblies (I1, I2, I3) are programmable logic circuits of FPGA (Field Programmable Gate Array) type.

10. Data routing system according to claim 1, wherein it works in a real-time data processing environment.

* * * * *